March 12, 1946. J. R. VOYLE ET AL 2,396,544
MILKING MACHINE
Filed Sept. 1, 1943
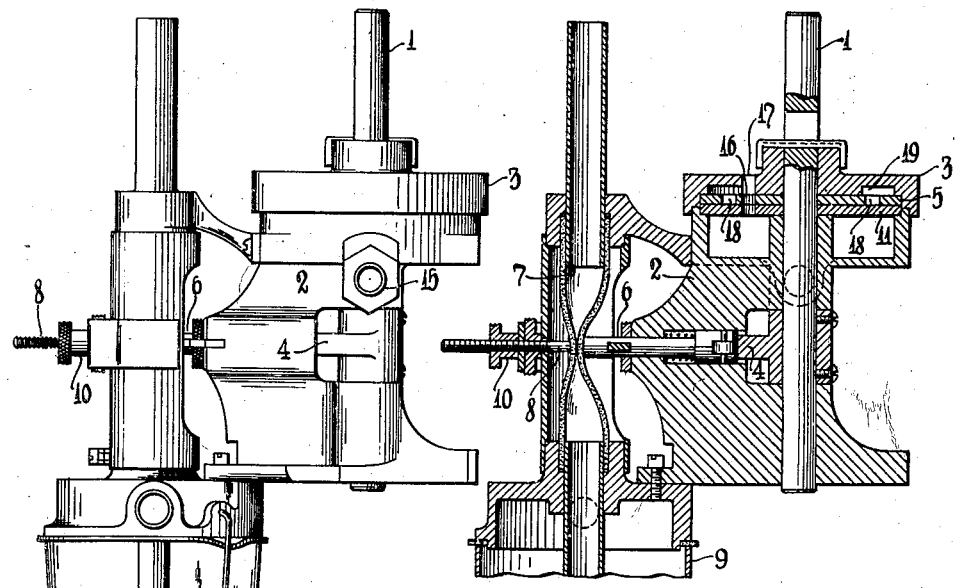
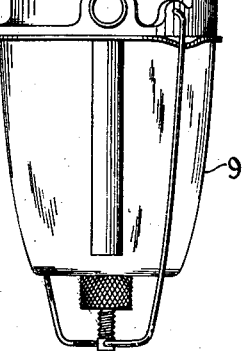
Fig-1-
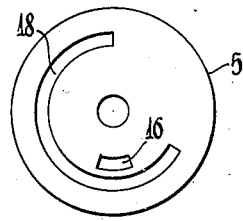
Fig-2-
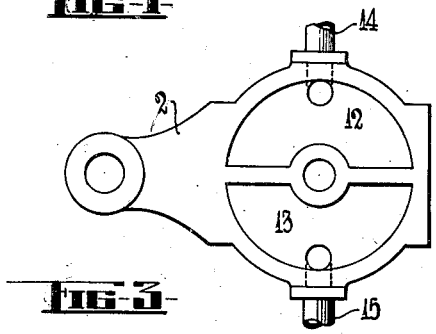
Fig-3-
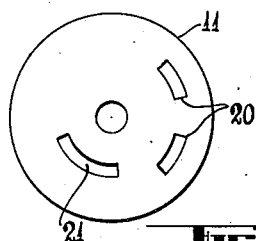
Fig-4-
Fig-5-
Inventors
J. R. Voyle
L. G. Grace
By Glascock Downing & Seeble Attys Patented Mar. 12, 1946

2,396,544

UNITED STATES PATENT OFFICE 2,396,544

MILKING MACHINE

John Robert Voyle and Laurence Gordon Grace, Auckland, New Zealand

Application September 1, 1943, Serial No. 500,830

3 Claims. (Cl. 31—86)

The invention relates to milking machines of the type, wherein it is known to interrupt or break what is commonly referred to as the constant or milking vacuum which acts in the interior or milk spaces of the teat cups, the object being to avoid, or at least reduce, the harmful effect of said vacuum acting constantly on the teats of the animals milked by said machines.

It is known in connection with devices used for attaining the aforesaid object, to employ means to pinch a rubber vacuum and milk, down pipe or dropper, or a rubber section inserted therein to cause said dropper or section thereof to act as a valve, which is closed and opened alternately, to interrupt the vacuum which acts on the cow's teats.

The object of the invention, is to provide improvements in the aforesaid type of machine, so as to give increased adjustability or timing of the pinching action of the dropper or section thereof in relation to the pulsations transmitted to the pulsator spaces of the teat cups, and also so as to provide, in a single unit, the means for effecting the pinching of the down dropper or the section thereof, the means for adjusting or regulating the pinching action of same, and an improved form of pulsator and a milk interceptor.

According to the invention there is incorporated in a single unit, a portion of a milk and vacuum pipe; a milk interceptor adapted to receive milk and open to said pipe portion; and a rotary pulsator having associated with its shaft means for interrupting the passageway through said milk and vacuum pipe portion.

The invention is illustrated in the accompanying drawing and will be further described in conjunction therewith.

Figure 1 being a side elevation of the complete unit according to the invention.

Figure 2 a part vertical sectional view thereof,

Figure 3 a plan view of same with the cap and the pulsator plates removed.

Figure 4 a plan view of the stationary plate of the pulsator and

Figure 5 an inverted plan view of the rotary plate of the pulsator.

As illustrated the single unit has incorporated therein a pulsator, a milk interceptor, and vacuum break means, in which the milk does not come in contact with the latter.

A rotary vertical shaft 1 driven by any suitable means is mounted in the body 2 of the unit, and has fixed thereon to rotate therewith, a cap 3 and a cam 4, the former having secured thereto the upper plate 5 of the pulsator, while the cam 4 is positioned in the body 2 of the unit opposite, and so as to actuate a spring loaded push rod 6 having an end formed to pinch the vacuum and milk down dropper 7 or a flexible section thereof, against a stop 8 to interrupt the vacuum which acts in the interior or milk spaces of the teat cups of a milking machine.

The down dropper 7, or the section thereof, adapted to be pinched, can be held in or passes through the unit, and is in communication with the interior of a milk interceptor 9 (preferably of glass) attached to or forming part of the unit.

Preferably the stop 8 aforesaid is adjustable by screw nut adjusting means 10 so that the extent or degree of the pinching action by the push rod 6 can be regulated, also the cam 4 is adjustably secured on the vertical shaft 1 in order to enable the action of the cam 4 to be regulated so that the pinching action can be timed to take place as desired in relation to the pulsations in the pulsator spaces of the teat cups, also the action of the cam 4 can be changed by substituting another cam formed to give a longer or shorter pinching action as required.

The upper plate 5 of the pulsator is rotated upon a lower plate 11 held stationary in the upper portion of the body 2, and over cavities or chambers 12, 13 therein, cavity or chamber 12 being adapted to be placed in communication through a nipple 14 with a source of vacuum, while cavity or chamber 13 is adapted to be placed in communication through a nipple 15 with the outer or pulsation spaces of teat cups of the milking machine.

The upper rotary plate 5 of the pulsator contains a port 16 open to atmosphere through a port 17 in the cap 3, and a port 18 shaped partly to conform to, and open to a circular chamber 19 in said cap 3, while the lower stationary plate 11 of the pulsator contains two ports 20 one of which is open to the cavity or chamber 12 and the other to the cavity or chamber 13, said plate 11 also containing a further port 21 which opens into the cavity or chamber 13 in communication with the pulsation spaces of the teat cups.

As the upper plate 5 is rotated on the lower plate 11 it causes the cavity or chamber 13 in communication with the pulsation spaces of the teat cups, to be put in communication with the cavity or chamber 12 open to the source of vacuum, alternately with being open to atmosphere, the putting of the cavity or chamber 13 under vacuum being effected by the port 18 in the rotary plate 5 bridging and passing over the ports 20 in the stationary plate 11, while the opening of said cavity or chamber 13 to atmosphere is effected by the port 16 in the plate 5 open to atmosphere, passing over the further or remaining port 21 in the plate 11.

Instead of containing a port 18, open to a circular chamber 19 in the cap 3, the plate 5 can have a partly circular groove or recess in its under surface, for bridging the ports 20 in the plate 11.

The squeeze and release phases of the pulsations can be altered by changing the plates 5, 11, with the ports therein, for other plates, having ports and recesses of different sizes, shapes and positions in relation to each other, also said plates are readily replaced when worn.

What we do claim and desire to obtain by Letters Patent of the United States of America is:

1. A milking machine unit, having incorporated therein a portion of a milk and vacuum pipe containing a flexible section; a milk interceptor adapted to receive milk and open to said pipe portion; a rotary pulsator including a shaft; a spring loaded push rod and a stop between which said flexible section is adapted to be pinched, and a cam on the shaft of the pulsator for operating said push rod.

2. A milking machine unit as claimed in claim 1 wherein the stop is adjustable for the purpose of varying the extent of the pinching action.

3. A milking machine unit as claimed in claim 1, wherein the cam is adjustable on the pulsator shaft for the purpose of varying the timing of the pinching action in relation to the operation of the pulsator.

JOHN ROBERT VOYLE.
LAURENCE GORDON GRACE.